United States Patent
Nachum et al.

(10) Patent No.: US 11,875,262 B2
(45) Date of Patent: Jan. 16, 2024

(54) LEARNING NEURAL NETWORK STRUCTURE

(71) Applicant: Google LLC, Mountain View, CA (US)

(72) Inventors: Ofir Nachum, Palo Alto, CA (US);
Ariel Gordon, North Fork, CA (US);
Elad Eban, Sunnyvale, CA (US); Bo Chen, Marina Del Rey, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/701,778

(22) Filed: Mar. 23, 2022

(65) Prior Publication Data
US 2022/0215263 A1 Jul. 7, 2022

Related U.S. Application Data (63) Continuation of application No. 15/813,961, filed on Nov. 15, 2017, now Pat. No. 11,315,019.

(51) Int. Cl.
*G06N 3/082* (2023.01)
*G06N 3/084* (2023.01)
*G06N 3/045* (2023.01)
*G06N 3/047* (2023.01)
*G06N 20/00* (2019.01)

(52) U.S. Cl.
CPC .............. *G06N 3/082* (2013.01); *G06N 3/045* (2023.01); *G06N 3/047* (2023.01); *G06N 3/084* (2013.01); *G06N 20/00* (2019.01)

(58) Field of Classification Search
CPC ........ G06N 3/082; G06N 20/00; G06N 3/047; G06N 3/045; G06N 3/084
See application file for complete search history.

(56) References Cited

U.S. PATENT DOCUMENTS

2019/0130271 A1* 5/2019 Narang .................. G06N 3/082

OTHER PUBLICATIONS

Swingler, Kevin. "Mixed Order Hyper-Networks for Function Approximation and Optimisation." (2016). (Year: 2016).*
Scardapane, Simone, et al. "Group sparse regularization for deep neural networks." Neurocomputing 241 (2017): 81-89. (Year: 2017).*

(Continued)

*Primary Examiner* — Kevin W Figueroa
(74) *Attorney, Agent, or Firm* — Fish & Richardson P.C.

(57) ABSTRACT

Methods, systems, and apparatus, including computer programs encoded on a computer storage medium, for training neural networks. In one aspect, a system includes a neural network shrinking engine that is configured to receive a neural network being trained and generate a reduced neural network by a shrinking process. The shrinking process includes training the neural network based on a shrinking engine loss function that includes terms penalizing active neurons of the neural network and removing inactive neurons from the neural network. The system includes a neural network expansion engine that is configured to receive the neural network being trained and generate an expanded neural network by an expansion process including adding new neurons to the neural network and training the neural network based on an expanding engine loss function. The system includes a training subsystem that generates reduced neural networks and expanded neural networks.

20 Claims, 5 Drawing Sheets

(56) References Cited

OTHER PUBLICATIONS

Freno, Antonino, et al. "One-pass ranking models for low-latency product recommendations." Proceedings of the 21th ACM SIGKDD International Conference on Knowledge Discovery and Data Mining. 2015. (Year: 2015).*
Bondarenko, Andrey, Arkady Borisov, and Ludmila Alekseeva. "Neurons vs weights pruning in artificial neural networks." Environment. Technologies. Resources. Proceedings of the International Scientific and Practical Conference. vol. 3. 2015. (Year: 2015).*
Åström, Fredrik. "Neural Network on Compute Shader: Running and Training a Neural Network using GPGPU." (2011). (Year: 2011).*
Wang, Jian, et al. "Convergence analyses on sparse feedforward neural networks via group lasso regularization." Information Sciences 381 (2017): 250-269. (Year: 2017).*
'nn.cs.utexas.edu' [online] "NEAT: Evolving Increasingly Complex Neural Network Topologies," Active from 2000-2011, [retrieved on Nov. 15, 2017] Retrieved from Internet: URL<http://nn.cs.utexas.edu/?neat> 2 pages.
Abadi et al. "Tensorflow: Large-scale machine learning on heterogeneous systems," arXiv 1603.04467v2 Mar. 16, 2016, 19 pages.
Alvarez et al. "Learning the Number of Neurons in Deep Networks," Advances in Neural Information Processing Systems, 2016, 9 pages.
Ash. "Dynamic Node Creation in Backpropagation Networks," Connection Science 1(4), Jan. 1, 1989, 11 pages.
Astronn, Fredrik. "Neural Network on Compute Shader : Running and Training a Neural Network using GPGPU." (2011). (Year: 2011).
Bondarenko, A. et al. "Neurons vs Weights Pruning in Artificial Neural Networks." (2015). (Year: 2015).
Chen et al. "Net2Net: Accelerating Learning Via Knowledge Transfer," arXiv 1511.05641v4, Apr. 23, 2016, 12 pages.
Collins et al. "Memory bounded deep convolutional networks," arXiv 1412.1442, Dec. 3, 2014, 10 pages.
Deng et al. "Imagenet: A large-scale hierarchical image database," IEEE Conference on Computer Vision and Pattern Recognition, Jun. 2009, 8 pages.
Denker et al. "Large automatic learning, rule extraction and generalization," Complex Systems, 1(5), May 1987, 46 pages.
Depenau, J. (Dec. 1, 1995). Automated design of neural network architecture for classification. Tidsskrift.dk. https://tidsskrift.dk/dainnipb/article/view/7029 (Year: 1995).
EP Office Action in European Application No. 18829529, dated Apr. 2, 2020, 7 pages.
Fahlman et al. "The Cascade-Correlation Learning Architecture," Advances in Neural information Processing Systems, 1990, 9 pages.
Feng et al. "Learning the structure of deep convolutional networks," Proceedings of the IEEE International Conference on Computer Vision, Dec. 2015, 9 pages.
Freno, A. (Aug. 10, 2015). One-pass ranking models for low-latency product recommendations. ACM Digital Library. https://dl.acnn.org/doi/10.1145/2783258.2788579 (Year: 2015).
Gates. "Adding Input Nodes to a Trained Neural Network," Jan. 31, 2000, [retrieved on Nov. 15, 2017] Retrieved from Internet: URL<http://scholar.google.com/scholar_url?url=http%3A%2F%2Fwww.eecs.uottawa.ca%2F~nat%2FCourses%2FCSci6903%2FFinal_Projects%2Fcarrie.ps&hl=en&sa=T&oi=gga&ct=gga&cd=1&ei=OmAMWtalDueNjgTAvI-4Dw&scisig=AAGBfm2gQ1bMG8et6g43qk2ios-Py9VHFQ&nossl=1&ws=2065x976> 9 pages.
Gemmeke et al. "Audio set: An ontology and human-labeled dataset for audio events," Proceedings of IEEE International Conference on Acoustics, Speech and Signal Processing, Mar. 2017, 5 pages.
Gordon et al. "MorphNet: Fast & Simple Resource-Constrained Structure Learning of Deep Networks," IEEE/CVF Conference on Computer Vision and Pattern Recognition, Jun. 18, 2018, 10 pages.

Han et al. "Learning both weights and connections for efficient neural network," Advances in Neural Information Processing Systems, Dec. 2015, 9 pages.
Hassibi et al. "Second order Derivatives for network pruning: Optimal Brain Surgeon," Advances in Neural Information Processing Systems, 1993, 8 pages.
He et al. "Deep residual learning for image recognition," Proceedings of the IEEE Conference on Computer Vision and Pattern Recognition, Jun. 26-Jul. 1, 2016, 9 pages.
Hershey et al. "CNN architectures for large-scale audio classification," IEEE International Conference on Acoustics, Speech and Signal Processing, Mar. 2017, arXiv 1609.09430v2, Jan. 10, 2017, 5 pages.
Hinton et al. "Distilling the Knowledge in a Neural Network," arXiv 1503.02531v1 Mar. 9, 2015, 9 pages.
Howard et al. "MobileNets: Efficient convolutional neural networks for mobile vision applications," arXiv 1704.04861, Apr. 17, 2017, 9 pages.
Huang et al. "Data-driven spare structure selection for deep neural networks," arXiv 1707.01213v2, Dec. 18, 2017, 9 pages.
Ioffe et al. "Batch normalization: Accelerating deep network training by reducing internal covariate shift," arXiv 1502.03167v3, Mar. 2, 2015, 11 pages.
Kevin, S. (May 2016). Mixed Order Hyper-Networks for Function Approximation and Optimisation. Storre. https://storre.stir.ac.uk/handle/1893/25349#.X9j9APIKhaQ (Year: 2016).
Kim et al. "Nemo: Neuro-evolution with multiobjective optimization of deep neural network for speed and accuracy," JMLR: Workshop and Conference Proceedings 1-1:8, 2017, 8 pages.
Le Cun et al. "Optimal Brain Damage," Proceedings of the 2nd International Conference on Neural Information Processing Systems, 1989, 8 pages.
Lebedev et al. "Fast convnets using groupwise brain damage," Proceedings of the IEEE Conference on Computer Vision and Pattern Recognition, Jun. 27, 2016, 11 pages.
Liu et al. "Learning efficient convolutional networks through networks slimming," arXiv 1708.06519, Aug. 22, 2017, 10 pages.
Liu et al. "Sparse convolutional neural networks," Proceedings of the IEEE Conference on Computer Vision and Pattern Recognition, Jun. 2015, 9 pages.
Molchanov et al. "Pruning convolutional neural networks for resource efficient transfer learning," arXiv 1611.06440v2, Jun. 8, 2017, 17 pages.
Murray et al. Auto-sizing neural networks: with applications to n-gram language models: arXiv 1508.05051, Aug. 20, 2015, 9 pages.
Neyshabur et al. "Path-SGD: Path-Normalized Optimization in Deep Neural Networks," arXiv 1506.02317, Jun. 8, 2015, 12 pages.
Ng . "Feature selection L1 vs. L2 regularization and rotational invariance," Proceedings of the twenty-first international conference on Machine learning, ACM, Jul. 2004, 20 pages.
NPL: Barat, A. (2015, January). Use of dropouts and sparsity for regularization of autoencoders in deep neural networks. BUIR Home. https://repository.bilkent.edu.tr/handle/11693/28915 (Year: 2015).
PCT International Preliminary Report on Patentability in International Application No. PCT/US2018/058368, dated May 19, 2020, 9 pages.
PCT International Search Report issued in International Application No. PCT/US2018/058368, dated Mar. 15, 2019, 15 pages.
Philippe Thomas, Marie-Christine Suhner. A new multilayer perceptron pruning algorithm for classification and regression applications. Neural Processing Letters, Springe.
Real et al. "Large-scale evolution of image classifiers," arXiv 1703.01041v2 Jun. 11, 2017, 18 pages.
Ren, Mengye, et al. "Normalizing the nornnalizers: Comparing and extending network normalization schemes." arXiv preprint arXiv: 1611.04520 (2016). (Year: 2016).
Sandler et al. "Mobile networks for classification, detection and segmentation," IEEE Conference on Computer Vision and Pattern Recognition, arXiv 1801.04381v1, Jan. 13, 2018, 14 pages.

(56) References Cited

OTHER PUBLICATIONS

Scardapane, S. (Jul. 2, 2016). Group sparse regularization for deep neural networks. arXiv.org. https://arxiv.org/abs/1607.00485 (Year: 2016).

Smith et al. "Gradual DropIn of Layers to Train Very Deep Neural Networks," arXiv 1511.06951v1, Nov. 22, 2015, 9 pages.

Soulie et al. "Compression of Deep Neural Networks on the Fly," arXiv 1509.08745v5, Mar. 18, 2016, 8 pages.

Sun et al. "Revisiting unreasonable effectiveness of data in deep learning era," arXiv 1707.02968v2, Aug. 4, 2017, 13 pages.

Szegedy et al. "Rethinking the inception architecture for computer vision," Proceedings of the IEEE Conference on Computer Vision and Pattern Recognition, Jun.-Jul. 2016, 9 pages.

Tibshirani. "Regression shrinkage and selection via the lasso," Journal of the Royal Statistical Society, Series B, (Methodological), Jan. 1996, 23 pages.

Tieleman et al. "Lecture 6.5-rmsprop: Divide the gradient by a running average of its recent magnitude," COURSERA: neural networks for machine learning 4(2), Oct. 2012, [Video Transcript], 3 pages.

Veniat et al. "Learning time-efficient deep architectures with budgeted super networks," arXiv 1706.00046v1, May 21, 2017, 11 pages.

Wen et al. "Learning Structured Sparsity in Deep Neural Networks," 30th Conference on Neural Information Processing Systems, Spain, 2016, 9 pages.

Williams. "Bayesian regularization and pruning using a laplace prior," Neural computation, 7(1), Jan. 1995, 25 pages.

Yuan et al. "Model selection and estimation in regression with grouped variables," Journal of the Royal Statistical Society: Series B (Statistical Methodology) 68(1), Feb. 2006, 29 pages.

Zhou et al. "Less is more: Towards compact cnns," European Conference on Computer Vision, Oct. 2016, 16 pages.

Zoph et al. "learning transferable architectures for scalable image recognition," arXiv 1707.07012v1, Jul. 21, 2017, 14 pages.

Zoph et al. "Neural Architecture Search with Reinforcement Learning," arXiv 1611.01578v1, Nov. 5, 2016, 15 pages.

\* cited by examiner

LEARNING NEURAL NETWORK STRUCTURE

CROSS REFERENCE TO RELATED APPLICATION

This patent application is a continuation (and claims the benefit of priority under 35 USC 120) of U.S. patent application Ser. No. 15/813,961, filed Nov. 15, 2017. The disclosure of the prior application is considered part of (and is incorporated by reference in) the disclosure of this application.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that performs neural network training.

According to a first aspect there is provided a system for training neural networks, the system comprising a neural network shrinking engine that is configured to: receive a neural network being trained; generate a reduced neural network by a shrinking process comprising: training the neural network based on a shrinking engine loss function that includes terms penalizing active neurons of the neural network, wherein: a neuron is active if dropping the neuron from the neural network, along with all its incoming and outgoing connections, would affect outputs of the neural network generated in response to processing inputs to the neural network; removing inactive neurons from the neural network; a neural network expansion engine that is configured to: receive the neural network being trained; generate an expanded neural network by an expansion process comprising: adding new neurons to the neural network; training the neural network based on an expanding engine loss function; a training subsystem that is configured to, at each of a plurality of time steps: generate a reduced neural network for the time step by providing an expanded neural network for a previous time step to the neural network shrinking engine; and generate an expanded neural network for the time step by providing the reduced neural network for the time step to the neural network expansion engine.

In some implementations, the terms of the shrinking engine loss function that penalize active neurons of the neural network comprise: a group lasso regularization term, wherein each group comprises the input weights of a neuron of the neural network.

In some implementations, the terms of the shrinking engine loss function that penalize active neurons of the neural network comprise: a batch normalization regularization term comprising a sparsity-inducing norm of a scale parameter of a batch normalization layer of the neural network.

In some implementations, each of the terms of the shrinking engine loss function that penalize active neurons of the neural network correspond to a different neuron of the neural network; and each of the terms of the shrinking engine loss function that penalize active neurons is weighted by a same factor.

In some implementations, each of the terms of the shrinking engine loss function that penalize active neurons of the neural network correspond to a different neuron of the neural network; and each of the terms of the shrinking engine loss function that penalize active neurons is weighted by a different factor that depends on a number of operations induced by a neuron corresponding to the term.

In some implementations, each of the terms of the shrinking engine loss function that penalize active neurons of the neural network correspond to a different neuron of the neural network; training the neural network based on the shrinking engine loss function comprises: adaptively adjusting weights of one or more terms of the shrinking engine loss function that penalize active neurons of the neural network during training.

In some implementations, adaptively adjusting weights of one or more terms of the shrinking engine loss function that penalize active neurons of the neural network during training comprises: determining that a constraint is not met at a particular training iteration; increasing values of weights of one or more terms of the shrinking engine loss function that penalize active neurons based on the constraint.

In some implementations: the constraint is on a maximum number of active neurons in the neural network; increasing values of weights of one or more terms of the shrinking engine loss function that penalize active neurons based on the constraint comprises: uniformly increasing values of weights of one or more terms of the shrinking engine loss function that penalize active neurons.

In some implementations: the constraint is on a maximum inference latency of the neural network; increasing values of weights of one or more terms of the shrinking engine loss function that penalize active neurons based on the constraint comprises: increasing values of weights of one or more terms of the shrinking engine loss function that penalize active neurons based on a number of a number of operations induced by a neuron corresponding to the term.

In some implementations, generating a reduced neural network by a shrinking process further comprises: additionally training the neural network after removing inactive neurons from the neural network in accordance with a loss function that does not include terms penalizing active neurons of the neural network.

In some implementations, additionally training the neural network after removing inactive neurons comprises re-initializing weights of neurons of the neural network.

In some implementations, training the neural network based on a shrinking engine loss function comprises: training the neural network for a fixed number of iterations.

In some implementations, training the neural network based on a shrinking engine loss function comprises: terminating training based on the shrinking engine loss function in response to determining that a set of one or more constraints are met.

In some implementations, the set of one or more constraints include one or more of: a constraint on a maximum number of active neurons in the neural network; a constraint on a maximum inference latency of the neural network; a constraint on maximum power consumption of the neural network; a constraint on a maximum memory footprint of the neural network.

In some implementations, the training subsystem is further configured to: provide one or more neural networks as output, wherein each of the neural networks provided as output is a reduced neural network for a particular time step or an expanded neural network for a particular time step.

In some implementations, each of the neural networks provided as output is associated with a cost-performance tuple, wherein: the cost term of the cost-performance tuple is based at least on one or more of: a number of active neurons of the neural network; an inference latency of the neural network; power consumption of the neural network; a memory footprint of the neural network; the performance term of the cost-performance tuple is based at least on an accuracy measure of the neural network.

In some implementations, adding new neurons to the neural network comprises: uniformly increasing the number of neurons in each layer of the neural network.

In some implementations, training the neural network based on the expanding engine loss function comprises: training only parameters of newly added neurons of the neural network.

In some implementations, training the neural network based on the expanding engine loss function comprises: training parameters of each neuron of the neural network.

In some implementations, training the neural network based on the expanding engine loss function comprises: training only parameters of newly added neurons of the neural network for a first number of training iterations; training parameters of each neuron of the neural network for a second number of training iterations after the first number of training iterations.

According to a second aspect there is provided one or more computer storage media storing instructions that when executed by one or more computers cause the one or more computers to perform the operations of the system for training neural networks.

According to a third aspect there is provided a method comprising the operations performed by the system for training neural networks.

Particular embodiments of the subject matter described in this specification can be implemented so as to realize one or more of the following advantages. The training system as described in this specification jointly learns the structure and parameters (e.g., weights) of a neural network. Therefore the training system as described in this specification can train neural networks that perform in a superior manner (e.g. superior prediction accuracy) relative to neural networks that are trained by learning the parameters of a neural network with a fixed structure, since the structure and parameters are jointly optimized and therefore well matched to generate, for example, accurate predictions. This results in a technical improvement in the field of machine learning.

The training system as described in this specification enables the structure and parameters of neural networks to be determined in accordance with performance constraints (e.g. accuracy) and cost constraints (e.g. memory constraints and/or inference latency constraints). This allows the system to generate neural networks that are more efficient (e.g. consume fewer computational resources) than neural networks trained by learning the parameters of a neural network of a fixed neural network structure. Moreover, unlike training systems that train multiple neural networks with different structures from scratch (e.g. from randomly initialized weight values) in order to select a neural network structure, the training system as described in this specification can learn the structure of the neural network by adaptively shrinking and expanding the neural network without re-initializing all the parameters of the neural network. Therefore, the training system as described in this specification can be more efficient (e.g. consume fewer computational resources and train more quickly) than training systems that simultaneously train multiple neural networks with different structures from scratch. These are also technical improvements in the field of machine learning.

The training system as described in this specification can generate a set of neural networks, each with different parameters and structure, and can associate each of the generated neural networks with a cost-performance measure. Therefore, instead of generating a single trained neural network as output, the training system as described in this specification generates multiple different trained neural networks, thereby allowing the neural network with cost-performance measure best suited to current system conditions (e.g. available computing power) to be selected for use at any given time. This is another technical improvement in the field of machine learning.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a training system for training a neural network by jointly learning the structure and the parameters of the neural network. The structure of a neural network refers to the number of layers of the neural network, the types of layers of the neural network (e.g. convolutional or fully connected), and the number of neurons in each layer. The parameters of a neural network refers to weights of connections between neurons of the neural network and other neural network parameters such as the scale and bias factors of batch normalization layers of the neural network. The system includes a shrinking engine and an expansion engine.

The training system receives a neural network to be trained as input, and for each of a series of time steps: shrinks the neural network using the shrinking engine to generate a reduced neural network for the time step, provides the reduced neural network for the time step to the expansion engine to generate an expanded neural network for the time step, and provides the expanded neural network for the time step as input to the shrinking engine at the next time step. In this manner, the training system generates and outputs a set of neural networks, corresponding to one or more of the reduced and expanded neural networks for the time steps.

These features and other features are described in more detail below.

Figure 1:
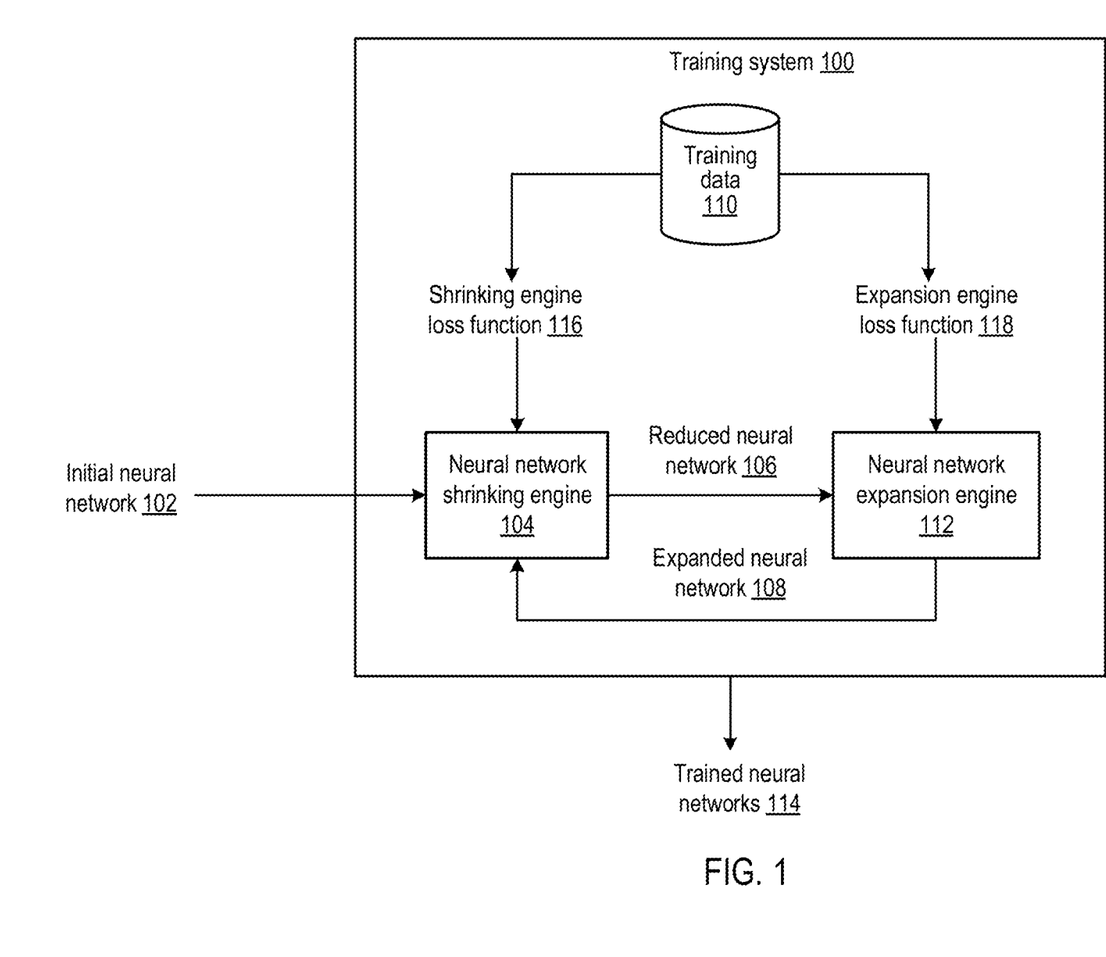
FIG. 1 is an illustration of an example training system.

FIG. 1 shows an example training system 100. The training system 100 is an example of a system implemented as computer programs on one or more computers in one or more locations in which the systems, components, and techniques described below are implemented.

The system 100 receives as input an initial neural network 102 and generates a series of reduced neural networks 106 and expanded neural networks 108 by training the initial neural network 102 based on a set of training data 110 over a series of time steps. The system 100 can generate as output a single neural network 114 that is optimized based on performance criteria, e.g., inference latency, or memory footprint, etc. However, in some implementations, the system 100 can generate as output multiple more trained neural networks 114 that each have particular performance characteristics, e.g., a first may have a minimum inference latency, a second may have a very high accuracy, a third may have been evaluated based on accuracy and memory footprint size, etc. In general, each of the trained neural networks 114 output by the system 100 may have a different structure and different parameter values.

Each of the trained neural networks 114 is trained by the system 100 to perform a same task. For example, the task may be an image classification task, where each of the trained neural networks 114 are configured to receive an image as input, to process the image, and to generate as output probabilities that the input image depicts a particular object. As another example, the task may be an object detection and recognition task, where each of the trained neural networks 114 are configured to receive an image as input, to process the image, and to generate as output parameters defining a bounding box in the input image and a probability that the bounding box contains an object of a particular type.

The contents of the training data 110 depend on the task. For example, if the task is an image classification task, the training data 110 may include images and corresponding labels, where the labels indicate objects depicted in the images. As another example, if the task is an object detection and recognition task, the training data 110 may include images with corresponding bounding boxes and bounding box labels, where each of the bounding boxes contain an object in the corresponding image, and the associated bounding box label indicates the particular type of the object contained in the bounding box.

The initial neural network 102 has a particular structure and parameter values. In some implementations, the parameter values of the initial neural network 102 are pre-trained to perform the task of the trained neural networks 114. For example, the initial neural network 102 may be pre-trained based on the training data 110. In some implementations, the parameter values of the initial neural network 102 are set in accordance with a parameter value initialization method that does not depend on the training data 110 (e.g., random initialization). In some implementations, the structure of the initial neural network 102 is set arbitrarily (e.g. randomly, in accordance with intuition, or based on structures of other neural networks that were previously trained for the same task and found to have good performance).

The system 100 includes a neural network shrinking engine 104 that is configured to receive a neural network as input and to generate as output a reduced neural network 106. The shrinking engine 104 trains the received neural network in accordance with a shrinking engine loss function 116 based on the training data 110. In general, the shrinking engine loss function 116 includes task loss terms and terms penalizing active neurons of the received neural network. A neuron of a neural network is referred to as active if dropping the neuron from the neural network, along with all of its incoming and outgoing connections, would affect outputs of the neural network generated in response to processing inputs to the neural network. Similarly, a neuron of a neural network is referred to as inactive if it is not active, i.e. if dropping the neuron from the neural network, along with all of its incoming and outgoing connections, would not affect outputs of the neural network generated in response to processing inputs. For example, a neuron may be inactive if the weights of all the input connections to the neuron are zero. As another example, a neuron may be inactive if the output of the neuron is subject to batch normalization, where the scale parameter of the batch normalization is zero. The task loss terms of the shrinking engine loss function 116 enforce the prediction accuracy of the received neural network in performing the task. The accuracy of the received neural network in performing the task is evaluated based on the training data 110.

In general, training the received neural network in accordance with the shrinking engine loss function 116 can render some of the neurons of the received neural network inactive. The shrinking engine 104 is configured to remove inactive neurons of the received neural network after training the received neural network in accordance with the shrinking engine loss function 116. Removing inactive neurons adjusts the structure of the received neural network by reducing the number of neurons in one or more layers of the received neural network, and in some cases, causing some layers to be entirely removed from the received neural network (i.e. if all of the neurons of the layer are removed). An example process for generating a reduced neural network is described with reference to FIG. 3A.

The system 100 includes a neural network expansion engine 112 that is configured to receive a neural network as input and to generate as output an expanded neural network 108. In general, the expansion engine 112 generates the expanded neural network 108 by adding new neurons to the received neural network and training received neural network with the newly added neurons in accordance with an expansion engine loss function 118. The expansion engine loss function 118 includes task loss terms that enforce the prediction accuracy of the received neural network in performing the task. The accuracy of the received neural network in performing the task can be evaluated based on the training data 110. An example process for generating an expanded neural network is described with reference to FIG. 4.

The system 100 generates different reduced neural networks and expanded neural networks over a series of time steps. For the first time step, the system may provide the initial neural network 102 to either the shrinking engine 104 or the expansion engine 112. At each of multiple subsequent time steps, the system 100 may generate a reduced neural network by providing an expanded neural network for a previous time step as input to the shrinking engine 104, and the system 100 may generate an expanded neural network by providing the reduced neural network for the time step as input to the expansion engine 112. Each of the neural networks generated for each time step can be associated with a different cost-performance tuple, as described in more detail below. The system 100 outputs one or more trained neural networks 114, including the reduced neural networks and/or the expanded neural networks generated for one or more time steps, in some cases along with their associated cost-performance tuples.

Figure 2:
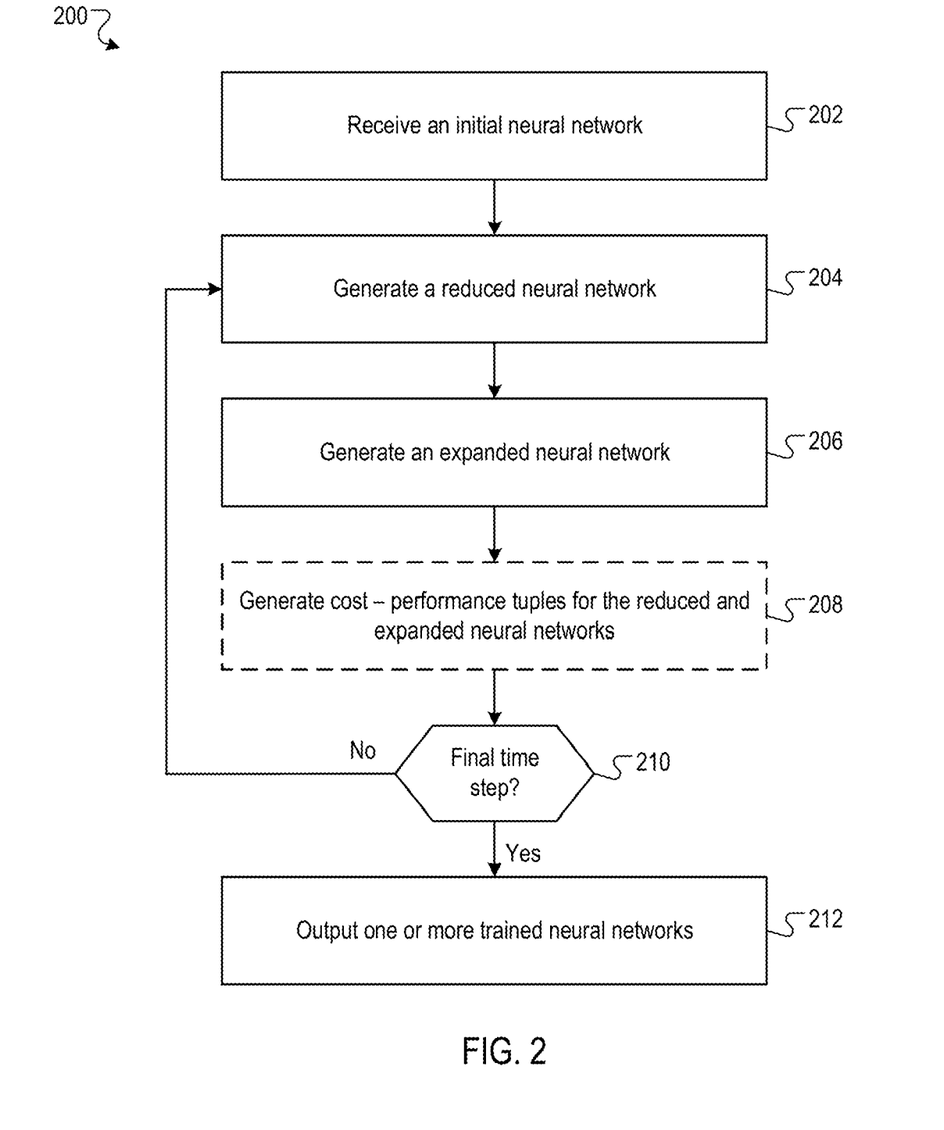
FIG. 2 is a flow diagram of an example process for generating trained neural networks.

FIG. 2 is a flow diagram of an example process for generating trained neural networks. For convenience, the process 200 will be described as being performed by a system of one or more computers located in one or more locations. For example, a training system, e.g., the training system 100 of FIG. 1, appropriately programmed in accordance with this specification, can perform the process 200.

The system receives an initial neural network (202). The initial neural network has a particular structure and parameter values. In some implementations, the parameter values of the initial neural network are pre-trained to perform a task. For example, the initial neural network may be pre-trained based on the training data. In some implementations, the parameter values of the initial neural network are set in accordance with a parameter value initialization method that does not depend on the training data (e.g., random initialization). In some implementations, the structure of the initial neural network is set arbitrarily (e.g. randomly, in accordance with intuition, or based on structures of other neural networks that were previously trained for the same task and found to have good performance). The initial neural network may be, for example, a feedforward neural network or a recurrent neural network.

At each of multiple time steps, the system generates a reduced neural network by providing a neural network to the neural network shrinking engine (204) and the system generates an expanded neural network by providing a neural network to the neural network expansion engine (206). An example process for generating a reduced neural network is described with reference to FIG. 3A and an example process for generating an expanded neural network is described with reference to FIG. 4.

In some implementations, for the first time step the system provides the initial neural network to the shrinking engine to generate a reduced neural network for the first time step, and provides the reduced neural network for the first time step to the expansion engine to generate an expanded neural network for the first time step. In these implementations, for each subsequent time step, the system provides the expanded neural network of the previous time step to the shrinking engine to generate a reduced neural network for the time step, and provides the reduced neural network for the time step to the expansion engine to generate an expanded neural network for the time step.

In some other implementations, for the first time step the system provides the initial neural network to the expansion engine to generate an expanded neural network for the first time step, and provides the expanded neural network for the first time step to the shrinking engine to generate a reduced neural network for the first time step. In these implementations, for each subsequent time step, the system provides the reduced neural network of the previous time step to the expansion engine to generate an expanded neural network for the time step, and provides the expanded neural network for the time step to the shrinking engine to generate a reduced neural network for the time step.

In some implementations, the system determines cost-performance tuples for the reduced and expanded neural networks generated for the time step (208). The cost term of the cost-performance tuple of a neural network may be determined based at least in part on one or more of: the number of active neurons of the neural network, inference latency of the neural network, power consumption of the neural network, and the memory footprint of the neural network. The inference latency of a neural network refers to the amount of time it takes the neural network to process an input to generate an output. The power consumption of a neural network refers to the amount of electrical energy consumed by the neural network by processing an input to generate an output. The memory footprint of a neural network refers to the amount of storage capacity required to store the neural network. In some implementations, the system determines the cost term of the cost-performance tuple for a neural network by combining terms based on one or more of the number of active neurons of the neural network, the inference latency of the neural network, the power consumption of the neural network, and the memory footprint of the neural network by a weighted linear combination. The performance term of the cost-performance tuple of a neural network may be determined based at least in part on the prediction accuracy of the neural network in performing the task. For example, the prediction accuracy of the neural network may be determined by computing the F1 score corresponding to predictions of the neural network.

At each time step of the multiple time steps, the system determines whether the current time step is the final time step (210). In some implementations, the system determines that the current time step is the final time step if the current time step is the last time step of a pre-determined number of time steps. In some implementations, the system determines that the current time step is the last time step if the cost-performance tuple determined for a neural network generated at the time step satisfies a criterion. For example, the criterion may require that the cost term be superior to a fixed cost threshold, and the performance term be superior to a fixed performance threshold. In some implementations, the system determines that the current time step is the final time step based on a combination of the previously described methods for determining whether the current time step is the final time step.

In response to determining that the current time step is not the final time step, the system returns to 204 and repeats the preceding steps. In response to determining that the current time step is the final time step, the system outputs one or more of the reduced neural networks and/or the expanded neural networks generated for one or more time steps (212). In some implementations, the system outputs the reduced neural network and the expanded neural network generated for every time step. In some implementations, the system outputs only those reduced neural networks and expanded neural networks where the corresponding cost-performance tuples for the neural network are not dominated by the cost-performance tuple determined for any of the other generated neural networks. A first cost-performance tuple is said to dominate a second cost-performance tuple if the cost term of the first cost-performance tuple is superior to the cost term of the second cost-performance tuple, and the performance term of the first cost-performance tuple is superior to the performance term of the second cost-performance tuple. For example, if the performance term of the cost performance tuple measures prediction error rate, then a first performance term would be superior to a second performance term if the first performance term were less than the second performance term.

In general, each of the trained neural networks output by the system have different parameters, structures, and cost-performance tuples. This allows the neural network best suited to current conditions (e.g. available computing power) to be later selected for use at any given time.

Figure 3A:
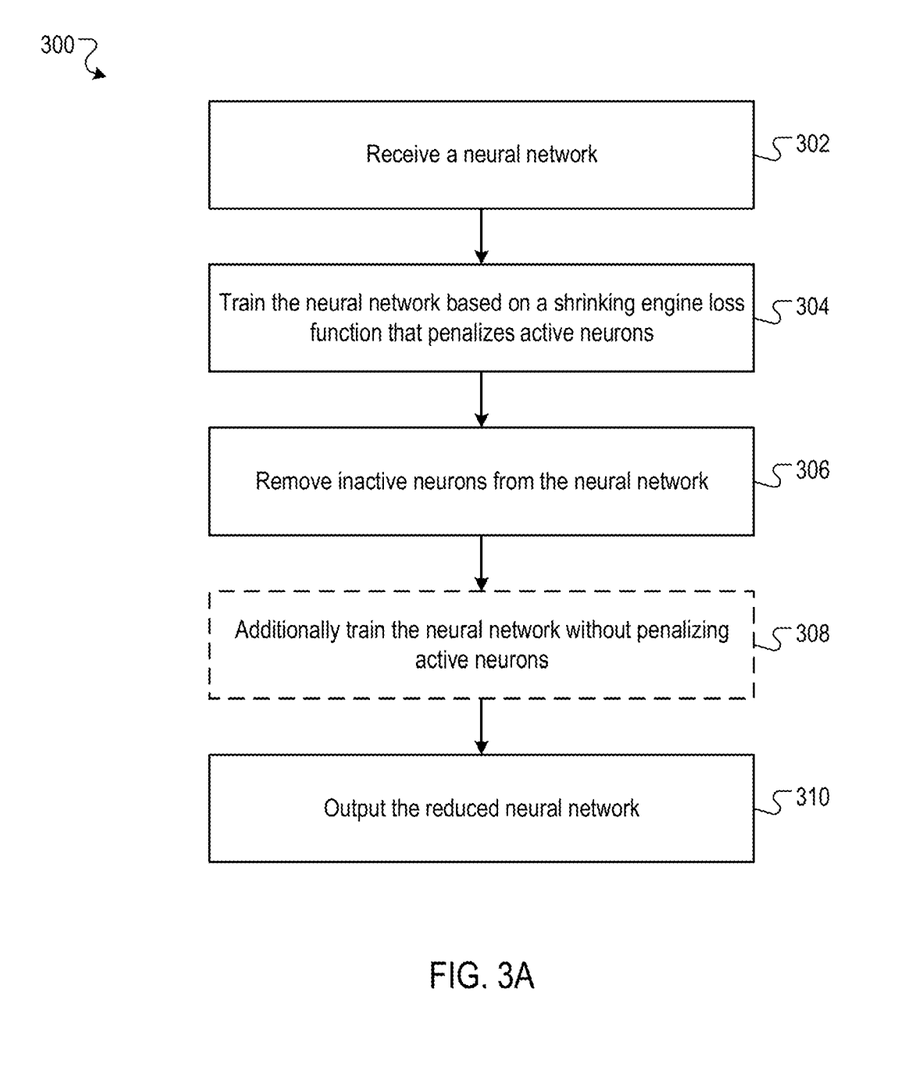
FIG. 3A is a flow diagram of an example process for generating a reduced neural network.

FIG. 3A is a flow diagram of an example process for generating a reduced neural network. For convenience, the process 300 will be described as being performed by an engine including one or more computers located in one or more locations. For example, a neural network shrinking engine, e.g., the neural network shrinking engine 104 of FIG. 1, appropriately programmed in accordance with this specification, can perform the process 300.

The engine receives a neural network (302). The received neural network may be the initial neural network (at the first time step) or an expanded neural network generated by the expansion engine.

The engine trains the neural network in accordance with a shrinking engine loss function that penalizes active neurons (304). An example process for training a neural network based on a shrinking engine loss function is described with reference to FIG. 3B.

The engine removes inactive neurons from the neural network, along with all of their incoming and outgoing connections (306). As discussed above, a neuron may be judged to be inactive when, for example, the weights of all the input connections to the neural network are zero, or when the scale parameter of a batch normalization operation applied to the output of the neural network is zero.

In some implementations, the engine performs additional training of the neural network in accordance with a loss function that includes task loss terms, but does not include terms penalizing active neurons of the received neural network (308). In some of these implementations, the engine re-initializes the parameters of the neural network (e.g. randomly) prior to performing the additional training.

The engine outputs the neural network, referred to as a reduced neural network (310).

Figure 3B:
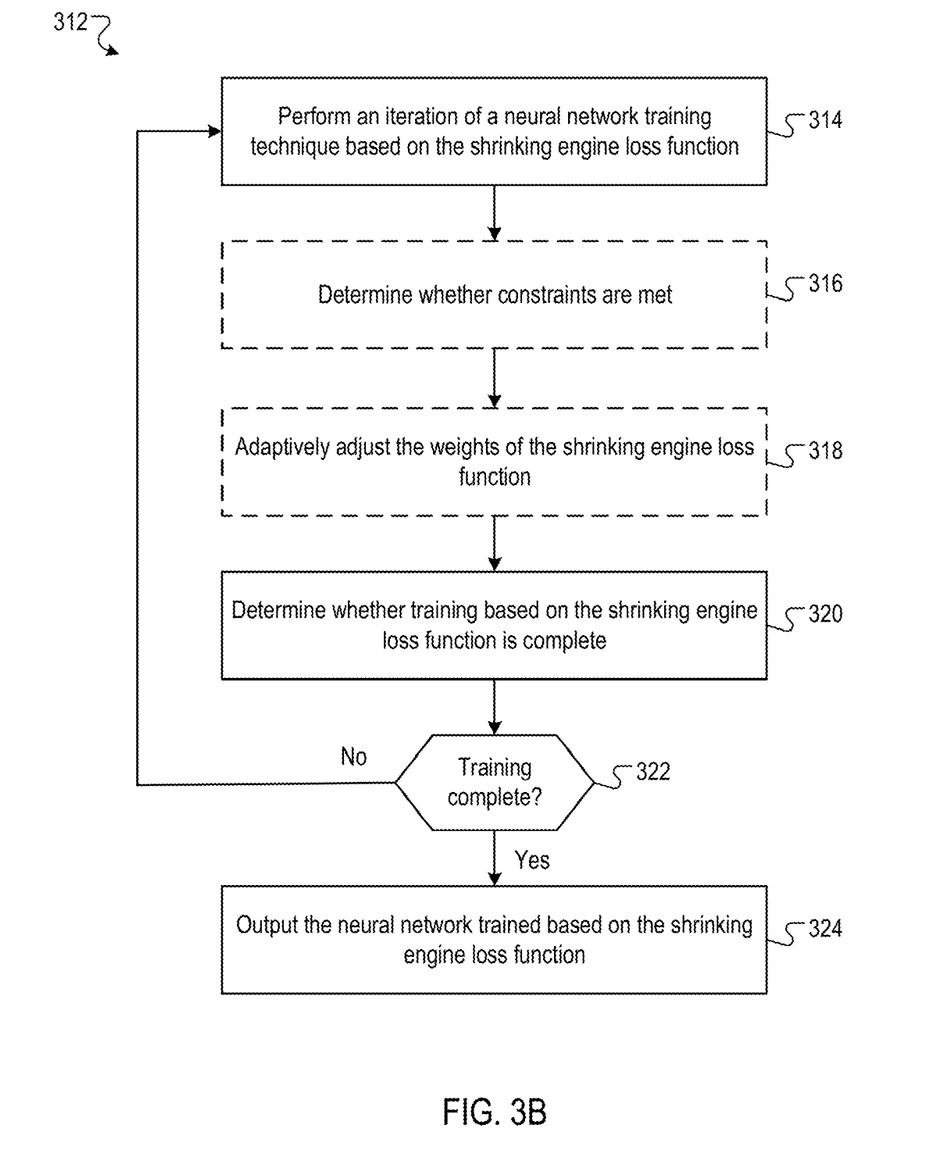
FIG. 3B is a flow diagram of an example process for training a neural network based on a shrinking engine loss function.

FIG. 3B is a flow diagram of an example process for training a neural network based on a shrinking engine loss function. For convenience, the process 312 will be described as being performed by an engine including one or more computers located in one or more locations. For example, a neural network shrinking engine, e.g., the neural network shrinking engine 104 of FIG. 1, appropriately programmed in accordance with this specification, can perform the process 312.

The engine performs an iteration of a neural network training technique based on the shrinking engine loss function (314). In some cases, the neural network training technique is stochastic gradient descent. In general, the shrinking engine loss function includes task loss terms and terms penalizing active neurons of the received neural network. The task loss terms of the shrinking engine loss function enforce the prediction accuracy of the neural network in performing the task. For example, depending on the application, the task loss may be a cross-entropy loss, a mean-squared error loss, or an exponential loss. The accuracy of the neural network in performing the task is evaluated based on the training data.

In some implementations, the terms of the shrinking engine loss function penalizing active neurons of the received neural network may include group lasso regularization terms, where each group comprises the input weights of a neuron of the neural network. Training the neural network based on a loss function including group lasso regularization terms where the groups correspond to the input weights of neurons of the neural network may cause one or more particular neurons to become inactive, as the full set of input weights of the particular neurons are set to zero. A neuron with all input weights set to zero is an inactive neuron since the output of the neuron is necessarily constant (e.g., zero), and therefore the neuron would not affect the outputs generated by the received neural network in response to processing inputs. In this specification, when a value (e.g., a weight of a neural network) is referred to as being zero, in some cases the value is not exactly zero, but the magnitude of the value is small enough to be considered negligible (e.g., near machine epsilon).

In some implementations, the terms of the shrinking engine loss function penalizing active neurons of the neural network may include batch-normalization scale factor regularization terms that involve a sparsity-inducing norm (e.g., an $L^1$ norm) of a scale factor of a batch normalization operation applied to a neuron. In some cases, if x is an output activation generated by a neuron, then the batch normalization operation transforms x to generate an output value y, where:

$$y = \gamma \cdot \hat{x} + \beta,$$

where $\hat{x}$ is a normalized version of x, y is referred to as the scale factor of the batch normalization operation, and $\beta$ is referred to as the bias factor of the batch normalization operation. Typically $\hat{x}$ is determined by determining the output activations x generated by the neuron for a batch of inputs to the neural network, determining the sample mean and sample standard deviation of the output activations corresponding to the batch of inputs, and adjusting the activations of the batch to normalize them (e.g., to have zero mean and unit variance). The scale factory and the bias factor $\beta$ are parameters of the neural network that are typically learned during training.

Training the received neural network based on a loss function including batch normalization scale factor regularization terms may cause one or more particular neurons to become inactive, as the scale factors of the batch normalization operations corresponding to the neurons are set to zero. A neuron with a corresponding batch normalization scale factor set to zero is an inactive neuron since the output of the neuron will be transformed by the batch normalization operation to be a constant (e.g., zero), and therefore the neuron would not affect the outputs generated by the received neural network in response to processing inputs.

An example of a shrinking engine loss function is given by:

$$\sum_{i=1}^{N} \text{loss}(w, x_i, y_i) + \lambda_1 |w|_2^2 + \sum_{j=1}^{J} \lambda_2^j |\gamma_j|_1 + \sum_{k=1}^{K} \lambda_3^k |w^k|_2,$$

where N is the number of training examples in the training data, loss (w, $x_i$, $y_i$) is a task loss function, $|w|_2^2$ is a $L^2$ regularization loss on the weights of the neural network, J refers to the number of neurons to which batch normalization scale parameter regularization is applied, $|\gamma_j|_1$ refers to the $L^1$ norm of the batch normalization scale parameter of a particular neuron indexed by j, $|w^k|_2$ refers to a group lasso regularization term on the weights of the input connections of a particular neuron indexed by k (e.g., the $L^2$ norm of the weights of the input connections of the particular neuron), and the $\lambda$-factors (i.e., $\lambda_1$, $\{\lambda_2^j\}_{j=1}^{J}$, and $\{\lambda_3^k\}_{k=1}^{K}$) are weighting factors. In general, batch normalization scale parameter regularization is applied to neurons which are subject to batch normalization instead of group lasso regularization, since applying group lasso regularization to such a neuron may cause numerical instability of the batch normalization operation.

In some implementations, the values of each of the λ-factors of the loss function that penalize active neurons of the neural network (i.e., $\{\lambda_2^j\}_{j=1}^J$, and $\{\lambda_3^k\}_{k=1}^K$) may be set to a same value. In some other implementations, the values of each of the λ-factors of the loss function that penalize active neurons of the neural network may be set based on the number of operations (e.g. additions and multiplications) induced by the corresponding neuron in order for the neural network to process an input and generate a corresponding output.

In some implementations, the engine determines whether each constraint of a set of one or more constraints are met (316). For example, the set of constraints may include a constraint on the maximum number of active neurons in the neural network. As another example, the set of constraints may include a constraint on the maximum inference latency of the neural network. In general, the set of constraints is provided to the engine, for example by a user of the engine.

In some implementations, the engine adaptively adjusts the λ-factor of one or more terms of the shrinking engine loss function that penalize active neurons of the neural network (318). In some cases, in response to determining that a particular constraint of the set of constraints is not satisfied by the neural network during the training iteration, the engine may increase the values of the particular λ-factors of the loss function that penalize active neurons of the neural network. For example, in response to determining that a constraint on the maximum number of active neurons in the neural network is not met (e.g., because the number of active neurons in the neural network exceeds the maximum number specified by the constraint), the engine may uniformly increase (e.g. multiply by a fixed scaling factor) the values of the particular λ-factors. As another example, in response to determining that a constraint on the maximum inference latency of the neural network is not met (e.g. because the inference latency of the neural network exceeds the maximum inference latency specified by the constraint), the engine may increase the values of the particular λ-factors such that the increase in the value of the λ-factor of a term is based on the number of operations induced by the neuron corresponding to the term. Specifically, the increase in the values of the λ-factors of terms that correspond to neurons which induce a larger number of operations may be greater than the increase in the λ-factors of terms that correspond to neurons which induce a smaller number of operations. Since the number of operations induced by the neurons of the neural network is directly related to the inference latency of the neural network, adaptively increasing the particular λ-factors in this manner may contribute to the neural network satisfying the maximum inference latency constraint in future training iterations.

The engine determines whether training of the neural network based on the shrinking engine loss function is complete (320). In some implementations, the engine determines that the training is complete when a pre-determined number of iterations of the training process are completed. In some implementations, the engine determines that that training is complete when the shrinking engine loss function converges (e.g., when the change in the value of the shrinking engine loss function between training iterations decreases below a pre-determined threshold). In some implementations, the engine determines that training is complete when a set of one or more constraints are satisfied. The set of constraints may include one or more of: a constraint on the maximum number of active neurons in the neural network, a constraint on the maximum inference latency of the neural network, a constraint on the maximum power consumption of the neural network, a constraint on the maximum memory footprint of the neural network. In general, the engine may determine whether the training is complete based on a combination of the previously described criteria.

In response to determining that the process of training the neural network based on the shrinking engine loss function is complete (322), the engine outputs the trained neural network (324). In response to determining that the process of training the neural network based on the shrinking engine loss function is not complete (322), the engine returns to 314 and repeats the preceding steps.

Figure 4:
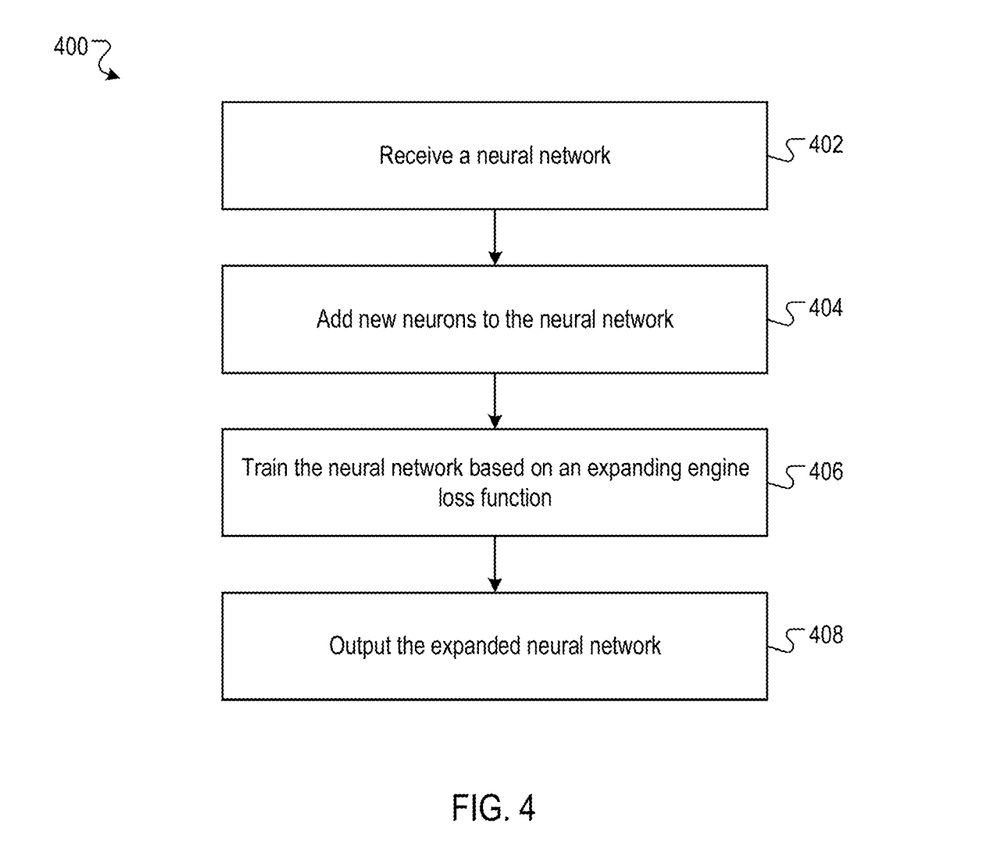
FIG. 4 is a flow diagram of an example process for generating an expanded neural network.

FIG. 4 is a flow diagram of an example process for generating an expanded neural network. For convenience, the process 400 will be described as being performed by an engine including one or more computers located in one or more locations. For example, a neural network expansion engine, e.g., the neural network expansion engine 112 of FIG. 1, appropriately programmed in accordance with this specification, can perform the process 400.

The engine receives a neural network (402). The received neural network may be the initial neural network (at the first time step) or a reduced neural network generated by the shrinking engine.

The engine adds new neurons to the neural network (404). In some implementations, adding neurons to the neural network includes uniformly increasing the number of neurons in each layer of the neural network. For example, the engine may add a number of neurons to each layer equal to a fixed fraction of the number of neurons currently in the layer. The engine generally adds neurons to a layer in accordance with the type of the layer (e.g. convolutional or fully-connected). For example, the engine may add new neurons to a convolutional layer by adding a new filter to the convolutional layer (i.e. a set of neurons that share the same input weights). As another example, the engine may add neurons to a fully-connected layer by adding new neurons that have inputs connections with non-zero weights from every neuron in the previous layer. In some implementations, the engine may add new layers to the neural network. In some cases, the weights of the incoming and outgoing connections of the new neurons may be initialized randomly. In some other cases, the weights of the incoming and outgoing connections of the new neurons may be initialized by copying (and potentially adding noise to) the weights of incoming and outgoing connections of existing neurons in the same layer.

The engine trains the neural network by backpropagating gradients to adjust the values of the set of parameters of the neural network based on an expanding engine loss function (406). In general, the expanding engine loss function includes a task loss and does not include terms penalizing active neurons of the neural network. In some implementations, the engine only trains the parameters (e.g., weights of incoming and outgoing connections) of newly added neurons of the neural network, and freezes (i.e., maintains at fixed values) the parameters of the other neurons of the neural network. In some implementations, the engine trains the full set of parameters of the neural network, including the parameters of all neurons. In some implementations, the engine only trains the parameters of newly added neurons of the neural network for a first number of training iterations, and trains the full set of parameters of the received neural network for a second number of training iterations after the first number of training iterations.

In some implementations, the engine determines that the training of the neural network based on the expanding engine loss function is complete after a pre-determined number of training iterations. In some implementations, the engine determines that training of the received neural network is complete when the expanding engine loss function converges.

The engine outputs the neural network, referred to as an expanded neural network (408).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system implemented by one or more computers for training a neural network, the system comprising:
 a neural network shrinking engine that is configured to:
  train the neural network based on a shrinking engine loss function that includes shrinkage terms penalizing active neurons of the neural network;
  remove inactive neurons from the neural network;
 a neural network expansion engine that is configured to:
  add new neurons to the neural network;
  train the neural network based on an expanding engine loss function;
 a training subsystem that is configured to, at each of a plurality of iterations:
  shrink the neural network, comprising:
   determining that the neural network does not satisfy a constraint and, in response, modifying the shrinking engine loss function to encourage the neural network to satisfy the constraint, wherein:
    the shrinking engine loss function comprises a set of one or more shrinkage factors that parameterize the shrinking engine loss function by modulating respective shrinkage terms in the shrinking engine loss function; and
    modifying the shrinking engine loss function comprises adjusting a respective value of each of one or more of the shrinkage factors of the shrinking engine loss function; and
   providing the neural network to the neural network shrinking engine; and
  expand the neural network by providing the neural network to the neural network expansion engine.

2. The system of claim 1, wherein adjusting a respective value of each of one or more of the shrinkage factors of the shrinking engine loss function comprises:
 increasing the respective value of each of one or more of the shrinkage factors of the shrinking engine loss function.

3. The system of claim 2, wherein the constraint is on a maximum number of active neurons in the neural network.

4. The system of claim 3, wherein increasing the respective value of each of one or more of the shrinkage factors of the shrinking engine loss function comprises:
 uniformly increasing values of the shrinkage factors of the shrinking engine loss function.

5. The system of claim 2, wherein the constraint is on a maximum inference latency of the neural network.

6. The system of claim 5, wherein increasing the respective value of each of one or more of the shrinkage factors of the shrinking engine loss function comprises, for each of one or more shrinkage terms of the shrinking engine loss function:

increasing a value of a shrinkage factor that scales the shrinkage term based on a number of a number of arithmetic operations induced by a neuron corresponding to the shrinkage term.

7. The system of claim 2, wherein the constraint is on power consumption of the neural network.

8. The system of claim 2, wherein the constraint is on a memory footprint of the neural network.

9. The system of claim 1, wherein the shrinkage terms of the shrinking engine loss function that penalize active neurons of the neural network comprise:

a batch normalization regularization term comprising a sparsity-inducing norm of a scale parameter of a batch normalization layer of the neural network.

10. The system of claim 1, wherein:

each of the shrinkage terms of the shrinking engine loss function that penalize active neurons of the neural network correspond to a different neuron of the neural network; and each of the shrinkage terms of the shrinking engine loss function that penalize active neurons is weighted by a different shrinkage factor that depends on a number of operations induced by a neuron corresponding to the shrinkage term.

11. The system of claim 1, wherein the shrinkage terms of the shrinking engine loss function that penalize active neurons of the neural network comprise:

a group lasso regularization term, wherein each group comprises input weights of a neuron of the neural network.

12. The system of claim 1, wherein the shrinking engine is further configured to:

perform additional training of the neural network after removing inactive neurons from the neural network in accordance with a loss function that does not include shrinkage terms penalizing active neurons of the neural network.

13. The system of claim 12, wherein:

performing additional training of the neural network after removing inactive neurons comprises re-initializing weights of neurons of the neural network.

14. The system of claim 1, wherein the training subsystem is further configured to:

provide one or more neural networks as output, wherein each of the neural networks corresponds to a respective iteration of the plurality of iterations.

15. The system of claim 14, wherein each of the neural networks provided as output is associated with a cost-performance tuple, wherein:

a cost term of the cost-performance tuple is based at least on one or more of:
a number of active neurons of the neural network;
an inference latency of the neural network;
power consumption of the neural network;
a memory footprint of the neural network;
a performance term of the cost-performance tuple is based at least on an accuracy measure of the neural network.

16. The system of claim 1, wherein adding new neurons to the neural network comprises:

uniformly increasing a number of neurons in each layer of the neural network.

17. The system of claim 1, wherein training the neural network based on the expanding engine loss function comprises:

training only parameters of newly added neurons of the neural network.

18. The system of claim 1, wherein training the neural network based on the expanding engine loss function comprises:

training only parameters of newly added neurons of the neural network for a first number of training iterations; and training parameters of each neuron of the neural network for a second number of training iterations after the first number of training iterations.

19. A method performed by one or more computers for training a neural network, the method comprising, at each of a plurality of iterations:

shrinking the neural network, comprising:
determining that the neural network does not satisfy a constraint and, in response, modifying a shrinking engine loss function to encourage the neural network to satisfy the constraint, wherein:
the shrinking engine loss function comprises a set of one or more shrinkage factors that parameterize the shrinking engine loss function by modulating respective shrinkage terms in the shrinking engine loss function, wherein each shrinkage term of the shrinking engine loss function penalizes active neurons of the neural network; and
modifying the shrinking engine loss function comprises adjusting a respective value of each of one or more of the shrinkage factors of the shrinking engine loss function; and
providing the neural network to a neural network shrinking engine that is configured to:
train the neural network based on the shrinking engine loss function; and
remove inactive neurons from the neural network; and expand the neural network by providing the neural network to a neural network expansion engine that is configured to:
add new neurons to the neural network; and
train the neural network based on an expanding engine loss function.

20. One or more non-transitory computer storage media storing instructions that when executed by one or more computers cause the one or more computers to perform operations for training a neural network, the operations comprising, at each of a plurality of iterations:

shrinking the neural network, comprising:
determining that the neural network does not satisfy a constraint and, in response, modifying a shrinking engine loss function to encourage the neural network to satisfy the constraint, wherein:
the shrinking engine loss function comprises a set of one or more shrinkage factors that parameterize the shrinking engine loss function by modulating respective shrinkage terms in the shrinking engine loss function, wherein each shrinkage term of the shrinking engine loss function penalizes active neurons of the neural network; and
modifying the shrinking engine loss function comprises adjusting a respective value of each of one or more of the shrinkage factors of the shrinking engine loss function; and
providing the neural network to a neural network shrinking engine that is configured to:
train the neural network based on the shrinking engine loss function; and remove inactive neurons from the neural network; and expand the neural network by providing the neural network to a neural network expansion engine that is configured to:
add new neurons to the neural network; and
train the neural network based on an expanding engine loss function.

* * * * *